May 3, 1949.  G. W. BORKLAND  2,468,731

PRODUCTION OF ORNAMENTED EMBOSSED ARTICLES

Filed April 26, 1946

Inventor:
Gustave W. Borkland

Patented May 3, 1949

2,468,731

UNITED STATES PATENT OFFICE 2,468,731

PRODUCTION OF ORNAMENTED EMBOSSED ARTICLES

Gustave W. Borkland, Marion, Ind.

Application April 26, 1946, Serial No. 665,293

1 Claim. (Cl. 41—24)

The present invention relates to the production of ornamented embossed articles.

Moreover, the invention relates particularly to a method of producing ornamented embossed articles from flat sheets of permanently deformable material, but also to a predecorated embossed article upon which the ornamentation is produced by the molding or drawing of a suitably ornamented plastic sheet upon which the decorations appear as a distorted image or pattern which is substantially a planar projection of the raised portions of the embossed article.

The production of embossed articles by drawing operations has long been practiced. However, such articles were usually either of a uniform color or had a uniformly colored surface. Whenever it was desired to produce an ornamented embossed article it was considered necessary first to emboss the article and then to decorate the same individually either by hand, or by means of air brushes and the like, applied either by hand or through suitable stencils. Such methods of production of course are slow and relatively expensive.

In accordance with the present invention, however, highly ornamented embossed articles may be produced in which the ornamentation preexists on the flat sheet which is embossed into the desired contour.

Accordingly it is one of the objects of the present invention to produce embossed articles, bearing surface ornamentation thereon, which are produced from flat sheets upon which a distorted pattern of the desired ornamentation appears. The drawing or molding causes the ornamentation to appear at the desired locations in the ultimate embossed shape so as to present a predetermined and pleasing appearance.

A further object of the invention is to provide a method by which an embossed plastic article is produced, to which the ornamentation is then applied, whereafter the sheet is caused to revert to its original flat shape, whereby the applied ornamentation will become flattened at the same time as the sheet, thereby appearing on the sheet in distorted form.

From the sheet thus obtained there may be prepared by suitable methods, which may or may not necessarily involve photography, a printing plate, by means of which other sheets of deformable material are imprinted with the distorted design, whereafter the thus printed sheets are suitably embossed to bring the ornamentation into the desired final position and form.

Other objects of the invention will appear from the further description herein below.

The invention is illustrated in a single sheet of drawings in which there have been illustrated, more or less diagrammatically, the various steps employed in the process. The drawing is not to scale, and is intended purely as a diagrammatic representation of the invention.

In the drawing:

Fig. 1 is a side elevation, partially in section, showing a sheet of deformable material being heated;

Fig. 2 which is a similar type of view shows the forming, molding or drawing of the sheet into a relatively high relief form of a human face;

Figure 6:
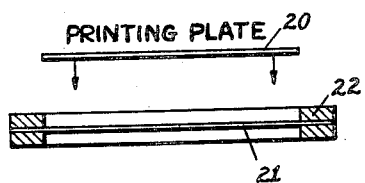
Fig. 6 illustrates diagrammatically the imprinting of a fresh sheet of plastic material.
Figure 7:
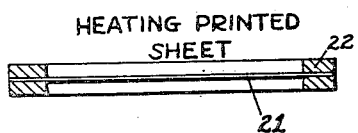
Figure 8:
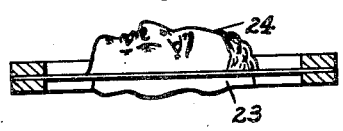

Fig. 7 indicates the heating of the printed sheet prepared in accordance with the showing of Fig. 6; and Fig. 8 illustrates the final shaping of the finished product.

The invention is illustrated, for exemplificative purposes, by the molding or drawing of thermoplastic material, although it is self-evident that the final object may be made from any type of permanently deformable material irrespective of whether the same be plastic or not, provided only that it is sufficiently deformable or capable of being shaped as by molding or drawing. However, for the production of the printing plate it is better to start with a sheet of thermoplastic material which has sufficiently retractile properties to enable it to return to a substantially flat condition upon being reheated.

The process in essence consists, for example, in clamping a sheet 9 of thermoplastic material within a frame 10 which firmly holds the peripheral portions 11 of the sheet so as to prevent them from moving. The sheet so held within its frame 10 is then heated, either by radiation or convection, so as to bring it into a deformable condition. In the case of such plastic sheets as cast cellulose ester or ether plastics, or of various vinyl esters and vinyl plastics comparatively mild heating suffices to render the sheet deformable, for example by molding or drawing.

With the sheet in the heated condition and still clamped within the frame 10, it is shaped, for example, into the form of a face 12, by means of a suitable mold or die 13. This shaping may be essentially a drawing operation which may be accomplished in accordance with applicant's Patent No. 2,357,806; or the methods taught in his applications Serial No. 537,353; filed May 25, 1944, and Ser. No. 569,526; filed Dec. 23, 1944.

In any event, once the desired contour, for example, the face 12, has been reached, the sheet is allowed to cool, while still being maintained within the mold die or drawing device, so that it will set in the desired contour.

Figure 1:
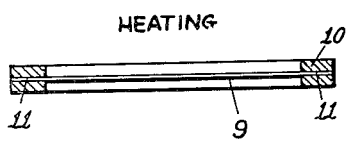
Figure 2:
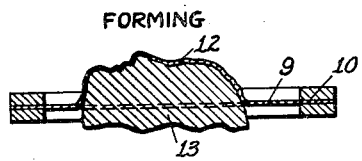
Figure 3:
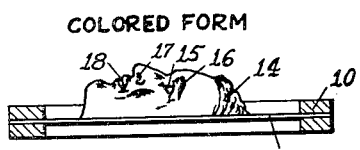
Fig. 3 illustrates the application of the ornamentation thereto such as the coloring of the eyes, hair, lips, nose, eyebrows, etc.
Figure 4:
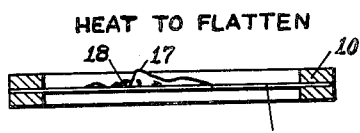
Fig. 4 is a similar view showing the return of the previously molded sheet to a flat condition.

Decoration is then applied thereto, as shown in Fig. 3, by coloring the hair 14, the eyes 15, the eyebrows 16, the shadow lines on the nose 17, the lips 18, and any other parts which require coloration. After the applied colors or ornamentation or other coating has become dry and set, the sheet is heated by any suitable means, as by being placed in an oven or subjected to radiation or convection heat, all this being done while the sheet remains clamped within the frame 10. Under the influence of the heat, and as indicated in Fig. 4, the sheet will re-assume its flat condition which is shown more or less diagrammatically. In Fig. 4 most of the hair is shown as having again become part of the flat sheet, only the nose 17 and the lips 18 still being in evidence.

Figure 5:
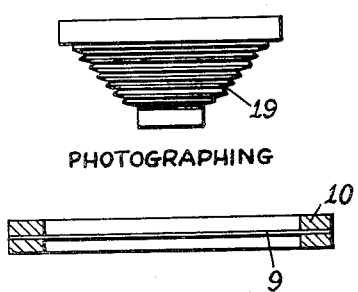
Fig. 5 illustrates the production of a printing plate, in this particular case by indicated photographic means.

By the time, however, the stage shown in Fig. 5 is reached, the sheet will have assumed a substantially planar condition. It will be self evident that upon its return from an embossed to a planar condition, the applied coloring matter or other ornamentation will find corresponding positions, in the eventual plane of the sheet, which bear a genetic relationship, more or less of a nature of a planar projection, to the ornamentation appearing upon the colored form shown in Fig. 3.

In other words, the sheet 9 as shown in Fig. 5 will now have ornamentation thereon, which appears to be in a considerable state of distortion. This sheet might be employed as a negative for the production of a direct print positive or, much more advantageously, the surface of the sheet 9 may be photographed by means of the photographic apparatus 19, diagrammatically illustrated in Fig. 5.

By ways well known in the art of photoengraving, a suitable printing plate 20 is produced from the negative made by means of the camera 19. This printing plate is then employed for printing upon a suitable sheet of plastic material 21 (Fig. 6) which is likewise held within a frame 22 which is entirely similar to the frame 10 shown in the previous figures. The printed sheet 21 within the frame 22 is then heated, and a mold or die 23, which is of entirely the same shape and contour as the mold or die 13 employed for the production of the original embossing (and which in fact may be the same mold or die) is employed to shape the sheet 21 into the form 24 shown in Fig. 8. The various colored parts of the sheet 21 are thus caused to be embossed, and, by reason of the proper orientation of the design on the printed sheet 21, there will be produced an object which is a substantial replica of that which had been hand colored as illustrated in Fig. 3.

It will be self evident that instead of employing a thermoplastic material, the sheet 21 may consist of a suitably distortable sheet of thin material which lends itself to drawing or molding operations. In that case of course heating will not be necessary, although it may be advisable to employ a matrix, corresponding in negative form to the outline of the object which is to be produced. As such use of matrices in connection with molding is a well known expedient it has not been specifically illustrated, but is to be considered as well within the skill of the art into which the present invention falls.

The invention has particular utility in the mass production of bas-relief or high relief articles from easily deformable material such as the cellulose ester and ether plastics, vinyl resins, polystyrene resins and the like without the necessity of hand decorating the molded objects. A manufacturer is thus placed in a position to supply the properly printed sheets which need merely be embossed by means of a proper mold or die to yield the desired ornamented embossed object.

It is realized by the inventor that, generally speaking, the embossing of previously printed sheets has been practiced for many years, but in all instances of such embossing the amount of distortion was so slight that an undistorted image or picture could be printed upon a flat sheet which then could be somewhat embossed without undue distortion of the picture which was thereby merely given a quasi-tridimensional effect. In cases, however, where very high relief is employed, an attempt to emboss an ordinary picture leads to the production of a very distorted embossed object. The present invention, however, solves this difficulty by the method hereinabove set forth.

The temperatures necessary to bring the plastic sheets into a condition of sufficient distortability are well known within the art and the temperatures for the proper shaping, drawing and molding of plastic sheets are usually supplied by the manufacturer or purveyor of such sheets, but generally speaking it may be stated that the temperatures lie somewhere between the range of 150° to 350° F.

When using applicant's method described in application Serial No. 537,353, now Patent No. 2,442,338, dated June 1, 1948, the more sharply indented portions of the sheets may be drawn against the mold by means of the application of a vacuum thereto, but where there are not many sharp indentations or reentrant angles, a simple drawing operation such as, for example, that of applicant's previous Patent No. 2,357,806 or the method of application Serial No. 569,526, now Patent No. 2,444,420, dated July 6, 1948, may be employed.

The invention is not to be limited to the use of any particular type of plastic or deformable material, as this is a matter of considerable choice.

Applicant claims:

Method of producing an ornamented embossed thermoplastic article which comprises the steps of suitably heating a sheet of permanently thermoplastic material having the property of returning to the flat condition when heated after shaping; drawing it into the desired contour and cooling it to effect retention of said contour; applying a decorative coating to selected embossed areas of the thus produced embossed article; re-heating said article to effect its reconversion into a substantially flat sheet, whereby the applied coating will assume a pattern corresponding substantially to a projection of the embossed areas of said article; photographing the re-flattened sheet and from the image obtained producing a printing-plate; imprinting a second sheet of thermoplastic material with a reproduction of said pattern by means of said plate; and embossing said second sheet to produce a reproduction of the original decorated embossed form.

GUSTAVE W. BORKLAND.

REFERENCES CITED

The following references are of record in the file of this patent:

UNITED STATES PATENTS

| Number | Name | Date |
|---|---|---|
| 348,222 | Lefferts et al. | Aug. 31, 1886 |
| 576,047 | Fairchild | Jan. 26, 1897 |
| 2,065,316 | Kimsel | Dec. 22, 1936 |
| 2,357,806 | Borkland | Sept. 12, 1944 |
| 2,040,073 | Karfiol et al. | July 16, 1946 |